United States Patent

Falace et al.

[11] Patent Number: 6,118,222
[45] Date of Patent: Sep. 12, 2000

[54] CIRCUIT FOR COMPLEMENTING AN AC MAINS VOLTAGE, PARTICULARLY FOR RESISTIVE LOADS

[76] Inventors: Lucio Falace, Via Posillipo, 308, 80123 Napoli; Rosario Tortora, Via Del Lauro, 25, 80062 Meta Di Sorrento, both of Italy

[21] Appl. No.: 09/284,013
[22] PCT Filed: Oct. 8, 1997
[86] PCT No.: PCT/EP97/05537
§ 371 Date: Apr. 5, 1999
§ 102(e) Date: Apr. 5, 1999
[87] PCT Pub. No.: WO98/16991
PCT Pub. Date: Apr. 23, 1998

[30] Foreign Application Priority Data

Oct. 11, 1996 [EP] European Pat. Off. .............. 96830518

[51] Int. Cl.[7] .................................................. H05B 37/00
[52] U.S. Cl. ......................... 315/241 R; 315/52; 315/71
[58] Field of Search ................................. 315/200 R, 71, 315/51, 52, 227 R, 240, 241 R

[56] References Cited

U.S. PATENT DOCUMENTS 4,998,044  3/1991  Nilssen ............................... 315/200 C

FOREIGN PATENT DOCUMENTS 0262950  4/1988  European Pat. Off. .
2051505  1/1981  United Kingdom .

*Primary Examiner*—David Vu
*Attorney, Agent, or Firm*—Guido Modiano; Albert Josif; Daniel O'Byrne

[57] ABSTRACT

A circuit for complementing the AC mains supply voltage, particularly for resistive loads, comprising a rectifier inserted between an AC power source and a resistive load and adapted to prevent the reverse flow of a processed portion of the AC supply voltage towards the AC power source, and one or more capacitors arranged ahead of the resistive load; the circuit has the particularity that the values of the one or more capacitors are chosen, according to table 2, low enough to maintain the AC nature of the AC voltage and to complement, during discharge towards the resistive load, the AC supply voltage until a desired value thereof is reached.

13 Claims, 11 Drawing Sheets

CIRCUIT FOR COMPLEMENTING AN AC MAINS VOLTAGE, PARTICULARLY FOR RESISTIVE LOADS

BACKGROUND OF THE INVENTION

The present invention relates to a circuit for complementing the supply voltage, particularly for resistive loads. More particularly, the present invention relates to a circuit for complementing the supply voltage that is suitable to be used ahead of a light source such as an incandescent lamp.

It is commonly known that the best light source currently available is constituted by filament lamps, which in optimum conditions (for example a 220 V supply voltage) constitute the cheapest commercially available light sources and offer the best chromatic yield (RA=100).

However, these lamps, which are supplied with a sinusoidal AC voltage at the frequency of 50 or 60 Hz (standard values of the mains), are subject to drawbacks in their use, since they are very negatively affected by any voltage decreases.

It is in fact known that the mains voltage (which is 220 V in Europe and is the rated value of the mains voltage for household use) is rarely usable, since depending on the distance from the distribution points there are voltage decreases due to voltage losses on the lines and to similar factors. In this way, the lamp designed to operate with a rated voltage that is equal to the ideal mains voltage (for example 220 V) is actually often supplied with a distinctly lower voltage.

This drawback is strongly felt in technologically backward countries, where the mains voltage can be affected by decreases, reaching approximately 170 V at the points of use, with a consequent high loss of efficiency equal to approximately 4.5 lumen/watt.

In this case, an incandescent lamp is not used at its best and the amount and quality of the light produced are considerably lower than the potential of the lamp.

Experimentation has in fact shown that in incandescent lamps with a tungsten filament, said filament is designed to operate at the rated mains voltage, but this occurs only for very short periods; accordingly, the frequencies emitted as photons tend to shift, within the spectrum, more towards the infrared than towards the ultraviolet. In this manner, the incandescent lamp used in a known manner uses part of the consumed energy to produce radiation in a range that is beyond the visual spectrum of the human eye, thus producing heat to the detriment of luminous efficiency.

The luminous efficiency of an incandescent lamp, for example a 40-watt lamp, in optimum operating conditions (for example 220 V AC), is approximately 8.5 lumen/watt. As the voltage decreases, for example to 210 V, the efficiency drops to approximately 7.35 lumen/watt. In practice, a loss of approximately 1 lumen/watt for every 10 V of mains voltage decrease is observed.

The decrease in efficiency caused by the decrease in the supply voltage is common to all devices supplied with AC power. For example, in the case of a water heater designed to operate at a preset operating voltage so as to bring water to the boiling temperature (approximately 100° C.), a lower-than-rated supply voltage can decrease the efficiency of the heater to the point of preventing it from reaching the boiling point of water, thus no longer performing the intended task.

Going back to incandescent lamps, in order to fully exploit these lamps it would be necessary to use a transformer or a voltage booster so as to raise the mains voltage to the rated value required by the lamp. The drawbacks of this solution are the cost, bulk, and consumption of these devices, as well as the difficulty in using them in a household environment.

Another drawback of conventional types of incandescent lamps is the high peak current that they must withstand at power-on time. If the lamp is switched on at the peak point of the sinusoidal curve of the AC voltage, and assuming the presence of an optimum rated voltage level (for example 220 V), the current that flows through the filament of the lamp is very high with respect to the current that flows when the lamp is already switched on.

Therefore, assuming that one is at the peak, at 220 V, the effective voltage is much higher and is precisely $220\sqrt{2}$, that is to say, approximately 310.2 V. At this voltage, since an incandescent lamp offers very low resistance when cold, a current of approximately 7–10 A flows through the lamp, causing magnetization of the filament and a violent contraction thereof, with breakage and projection of the pieces of filament.

Solutions have been proposed which supply an incandescent lamp with a DC current, which as known cannot be drawn directly from the electric mains.

For this purpose, it has been proposed to use a conventional current rectifier (for example of the diode-bridge type to achieve full current rectification) arranged ahead of the load, with at least one smoothing capacitor parallel-connected thereto to obtain a perfectly DC output current to supply the load.

Such a configuration is known, for example, from British patent application no. 2,051,505. In this document, the above described rectifier circuit is used ahead of an inverter to which an incandescent lamp is parallel-connected.

The purpose of the circuit proposed by the British document is to allow to supply a lamp equally with AC current (in normal operating conditions) or with DC current (in emergency conditions), making the inverter operate correctly in both of the above described operating conditions.

Another example of application of a rectifying and smoothing circuit ahead of the load can be found in European patent application no. 0 254 506. In this second document, the capacitive means arranged after the rectifier have the purpose of limiting and smoothing the voltage peaks that are normally present in the mains AC voltage, in order to avoid excessive voltages on the load that is being supplied.

The capacitive means therefore have the purpose of protecting the load, which is supplied with a DC voltage.

Both of the above described prior documents use the rectifying and smoothing circuit to obtain a perfectly DC output current (voltage). For this purpose, the smoothing capacitor or capacitors have sizes that are selected so as to "clip" the voltage peaks and fill the "troughs" of the rectified voltage. This effect is shown in FIG. 2.

The value of the smoothing capacitor must therefore necessarily be chosen large enough to perfectly level the peaks of the rectified mains voltage, preventively reduced by the $\sqrt{2}$ factor. That is, for example, $220/\sqrt{2}=156V$ which, transformed in direct voltage will be equal to $156\times\sqrt{2}=220V$ (DC).

The drawback of DC power supply is the fact that the incandescent lamp considerably reduces its life and that the high-value capacitor is difficult to integrate or in any case insert in a conventional light bulb or in the lamp holder.

SUMMARY OF THE INVENTION

The aim of the present invention is therefore to provide a circuit for complementing the AC mains supply voltage, particularly for resistive loads, that allows to raise the voltage that is available from the electric mains, in order to supply a load at all times with a voltage that is AC but has a desired value.

Within the scope of this aim, an object of the present invention is to provide a circuit for complementing the AC mains supply voltage for resistive loads in general and for incandescent lamps in particular that allows to drastically increase the efficiency of said source of light, at the same time ensuring a higher brightness level than obtained in the conventional type of use of said source of light.

Another object of the present invention is to provide a circuit for complementing the AC mains supply voltage that can be used both with normal incandescent lamps and with halogen lamps, mercury lamps, or lamps using another gas that do not require ballasts or transformers.

Another object of the present invention is to provide a circuit for complementing the AC mains supply voltage that is capable of providing, in output, an AC voltage having a desired value, compensating for any voltage deficits of the mains, so as to supply a load at all times with its rated voltage.

Another object of the present invention is to provide a circuit for complementing the AC mains supply voltage that is capable of avoiding the thermal shock that occurs during the power-on of a lamp.

Another object of the present invention is to provide a circuit for complementing the AC mains supply voltage that has negligible consumption.

Another object of the present invention is to provide a circuit for complementing the AC mains supply voltage that can be used inside a normal light bulb and inside a plug, switch, extension cord, or lamp holder.

Another object of the present invention is to provide a circuit for complementing the AC mains supply voltage that is capable of avoiding the unpleasant strobe effect of currently used light sources.

Another object of the present invention is to provide a circuit for complementing the AC mains supply voltage, particularly for resistive loads, that is highly reliable and relatively easy to produce at competitive costs.

This aim, these objects, and others that will become apparent hereinafter are achieved by a circuit for complementing the AC mains supply voltage, particularly for resistive loads, comprising means inserted between an AC power source and a resistive load, said means being suitable to prevent the reverse flow of a processed portion of the AC supply voltage towards said AC power source, and one or more capacitive means arranged ahead of said resistive load, characterized in that the values of said one or more capacitive means are chosen, according to table 2, low enough to maintain the AC nature of said AC voltage and to complement, during discharge toward said resistive load, said AC supply voltage until a desired value thereof is reached.

This aim and these objects are also achieved by a method for complementing the AC mains supply voltage, particularly for use with resistive loads, characterized in that it comprises the steps of:

arranging, between an AC power source and a resistive load, means suitable to prevent the reverse flow of a processed portion of the AC voltage toward said AC power source; and arranging one or more capacitive means ahead of said resistive load, the values of said one or more capacitive means being chosen, according to table 2, low enough to maintain the AC nature of said AC voltage supplied by the power source, said values being furthermore chosen so as to complement, during the discharge of said one or more capacitive means towards said resistive load, said AC supply voltage until a desired value thereof is reached.

BRIEF DESCRIPTION OF THE DRAWINGS

Further characteristics and advantages of the invention will become apparent from the description of a preferred but not exclusive embodiment of the circuit according to the invention, illustrated only by way of non-limitative example in is the accompanying drawings, wherein.

DESCRIPTION OF THE PREFERRED EMBODIMENTS

Figure 1:
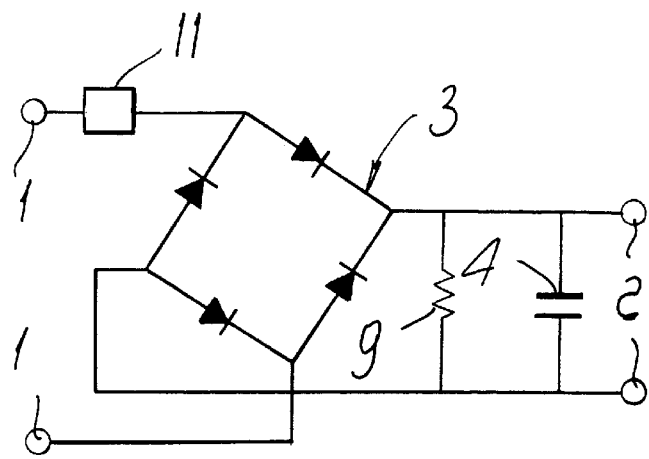
FIG. 1 is a circuit diagram of a first embodiment of the circuit according to the invention.

In the continuation of the description and in all the figures, identical reference numerals designate identical elements.

With reference to the above figures, the circuit according to the invention, shown in FIG. 1, comprises: two input terminals 1 for connection to the mains; two output terminals 2 for connection to the light source; means 3 that are suitable to prevent the reverse flow of the portion of the processed AC voltage toward the mains and are conveniently provided by a rectifier 3 that is interposed between the input terminals 1 and the output terminals 2; and capacitive means 4 connected between the output of the rectifier 3 and the output terminals 2.

Means 3 can suitably be constituted also by a transistor, a SCR and the like (a semiconductor device in general), not necessarily by a rectifier 3.

A resistor 9 is parallel-connected to the capacitive means 4 and a fuse 11 is arranged at the input terminals 1.

Advantageously, the rectifier 3 can be constituted by a half-wave rectifier or by a full-wave rectifier.

Figure 4:
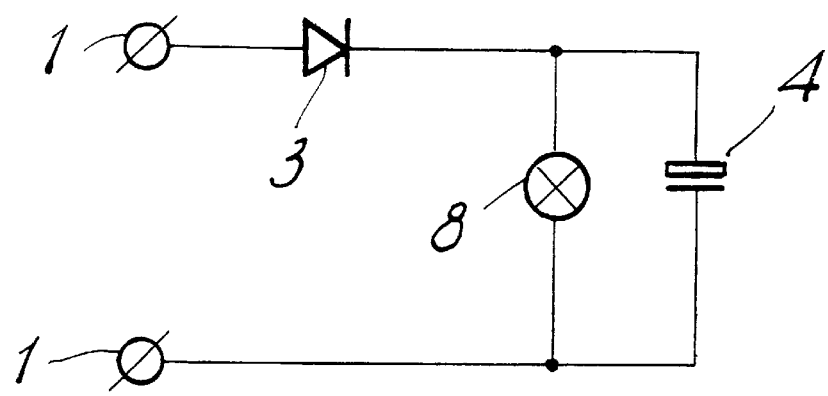
FIG. 4 is a view of a second embodiment of the circuit according to the invention.
Figure 4A:
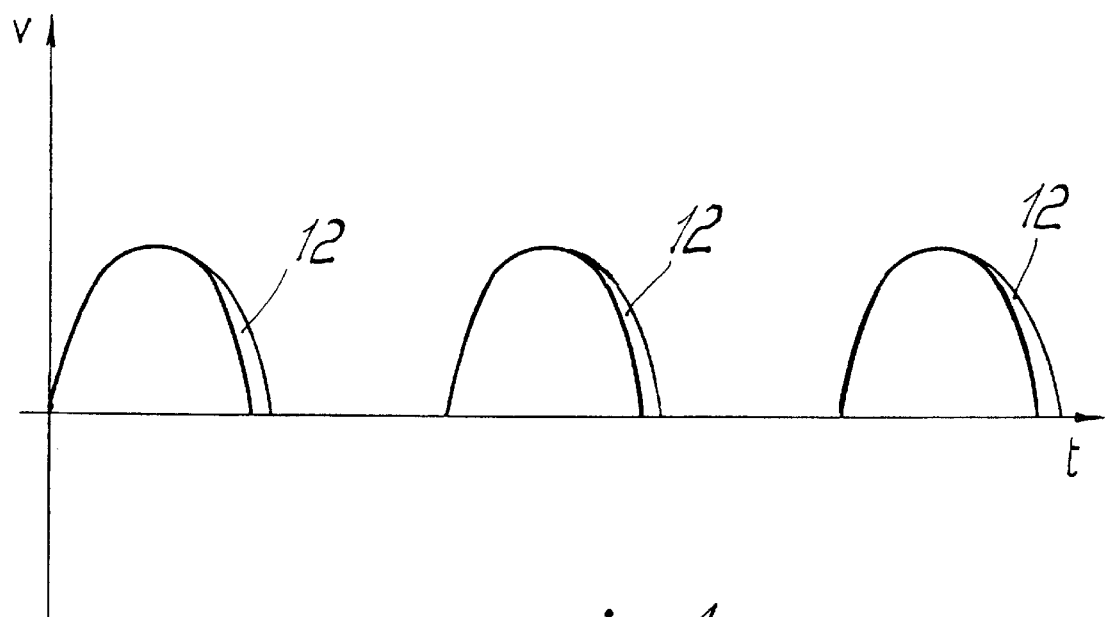
FIG. 4a plots the output waveform of the voltage, as a function of time, for the circuit of FIG. 4.

FIG. 4 is a view of a second embodiment of the circuit according to the invention, in which the rectifier 3 is indeed constituted by a single diode to perform half-wave rectification. FIG. 4a plots the half-wave rectified AC voltage.

The full-wave rectifier is preferably constituted by a diode bridge. A full-wave rectifier 3 is shown in FIG. 1 for the sake of convenience in description.

The capacitive means 4 conveniently comprise a capacitor.

Figure 1A:
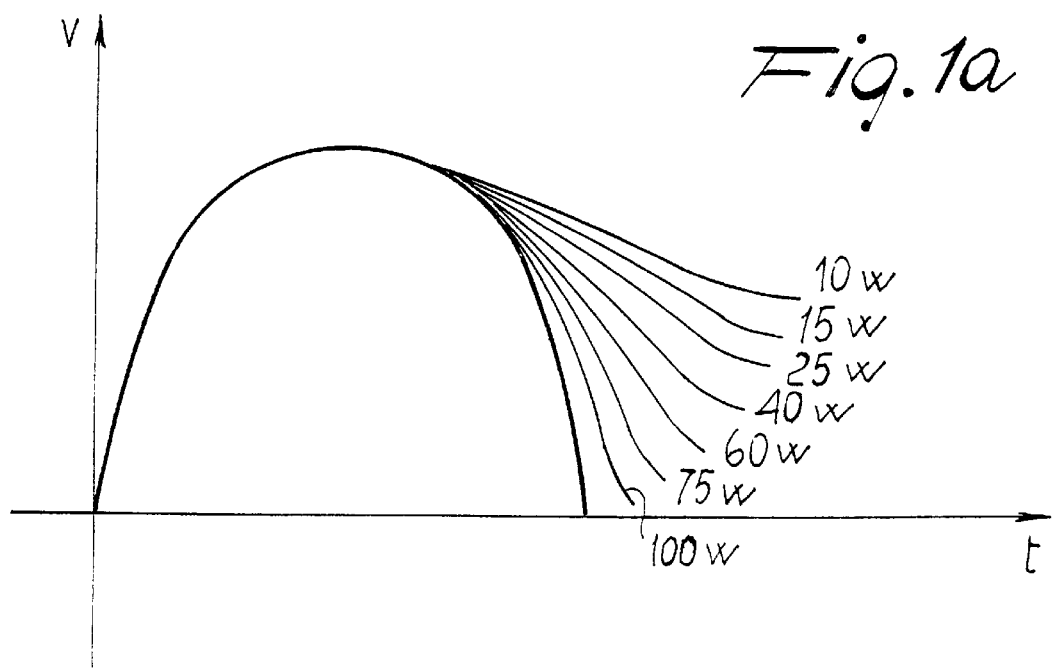
FIG. 1a plots the voltage, as a function of time, in output from the circuit of FIG. 1, illustrating a group of curves, each curve being related to a different value (different power level) of the load.

FIG. 1a is a view of a group of curves that plot the output voltage of the circuit of FIG. 1 as a function of different values of the load; in this case, the load is constituted by an incandescent lamp with power levels that vary between 10 watts and 100 watts.

Figure 1B:
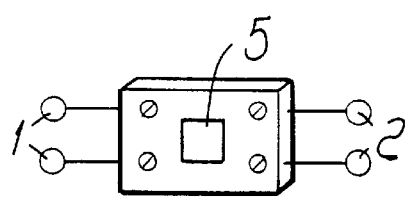
FIG. 1b is a view of the circuit of FIG. 1 inserted in a box-like body.

FIG. 1b is a view of the circuit of FIG. 1, inserted within a box-like body 5 meant to accommodate it.

Figure 2:
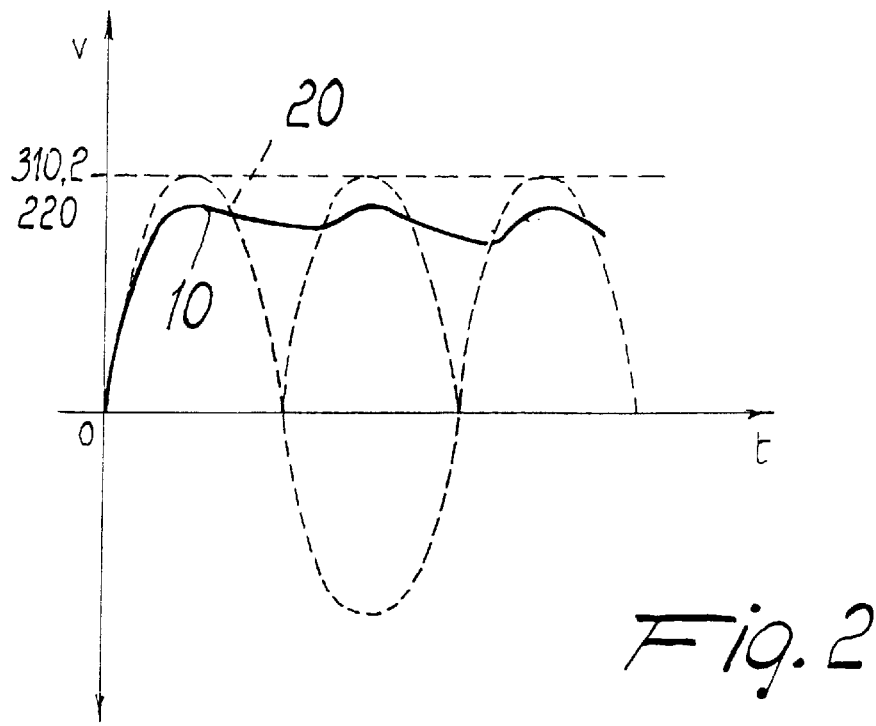
FIG. 2 plots the voltage, as a function of time, in output from a circuit that is similar to the one shown in FIG. 1 but uses conventional-type capacitive values and preventive lowering by √2 factor by a reducer-transformer.

FIG. 2 instead plots the output waveform of the AC voltage obtained by a known type of circuit, similar to the circuit of FIG. 1, but with capacitive values chosen according to conventional criteria (in addition to a preventive lowering of the voltage) to achieve optimum smoothing of the peaks of the AC voltage, so as to obtain a perfectly DC voltage.

In this case, the value of the capacitor 4 is chosen according to this purpose.

In FIG. 2, the reference numeral 20 designates the full-wave rectified AC voltage and the reference numeral 10 designates the DC voltage that is obtained by smoothing the AC peaks by means of the capacitor 4.

Figure 2A:
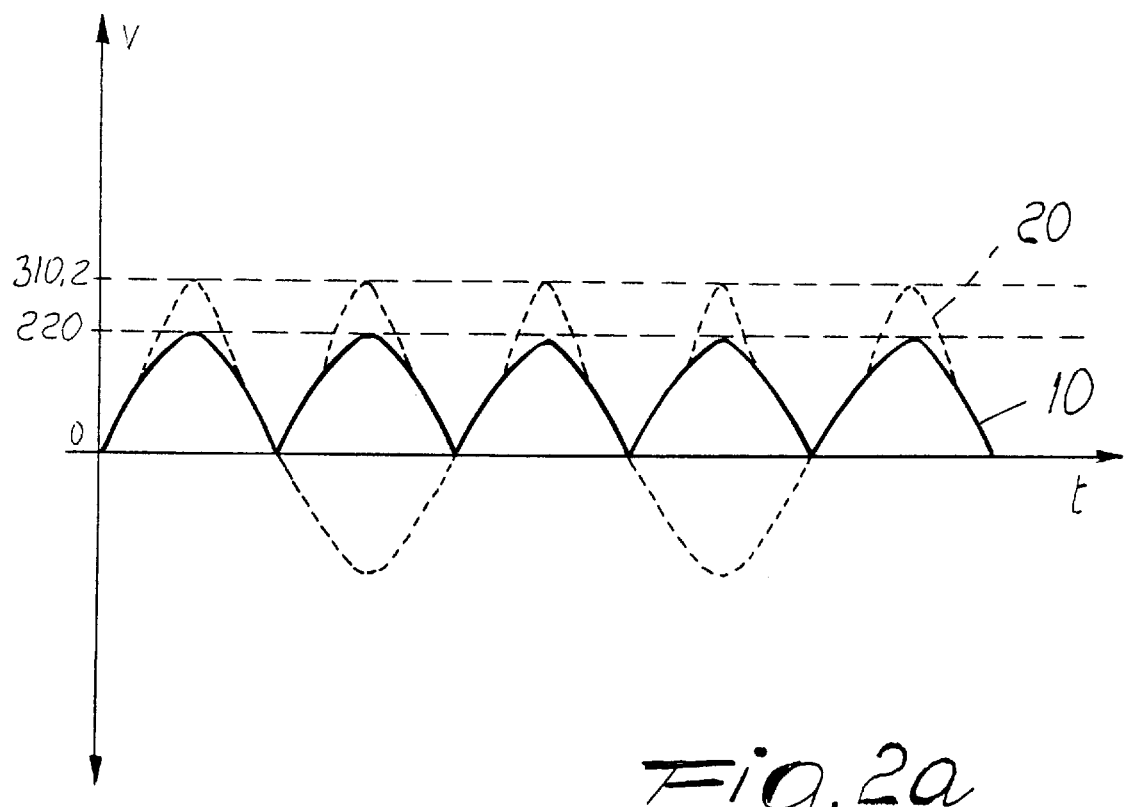
FIG. 2a plots the output voltage of the circuit of FIG. 1, ahead of the capacitive means, illustrating the rated voltage and the effective voltage, without voltage correction by a transformer.

FIG. 2a plots the rectified AC voltage in output from a full-wave rectifier and illustrates the values of the rated voltage (in this case, for example, 220 V) and the values of the effective voltage (310.2 V). The effective voltage therefore reaches peaks of 310.2 V, whereas the rated voltage has the ordinary value of 220 V. Accordingly, there is a difference of 90.2 V between the two voltage peak values.

Figure 3A:
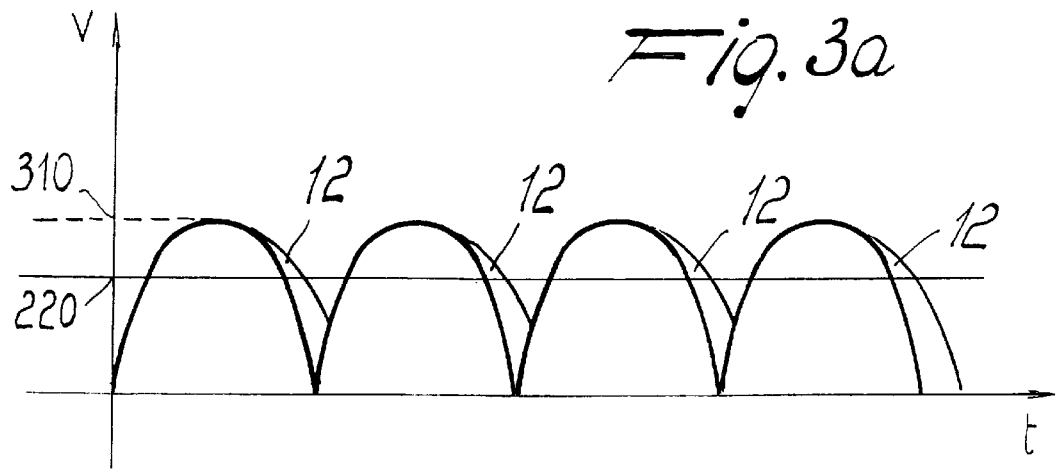
FIGS. 3a–3c plot the voltage as a function of time downstream of the circuit of FIG. 1, as a function of the power level of the load.
Figure 3B:
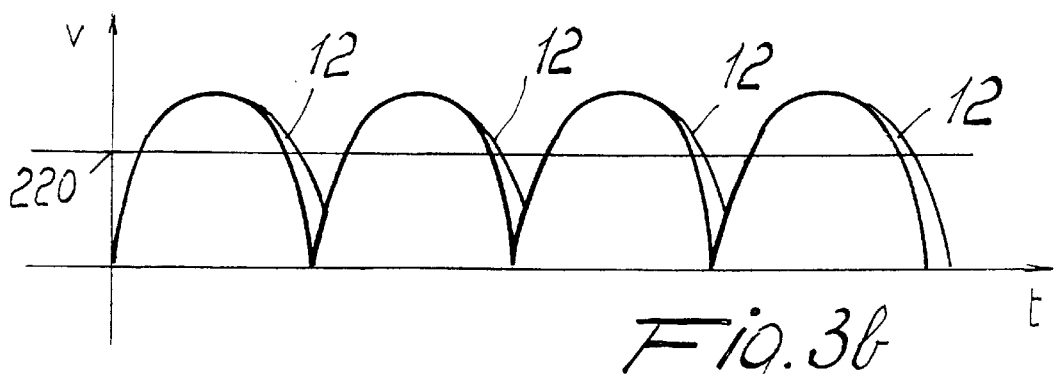
Figure 3C:
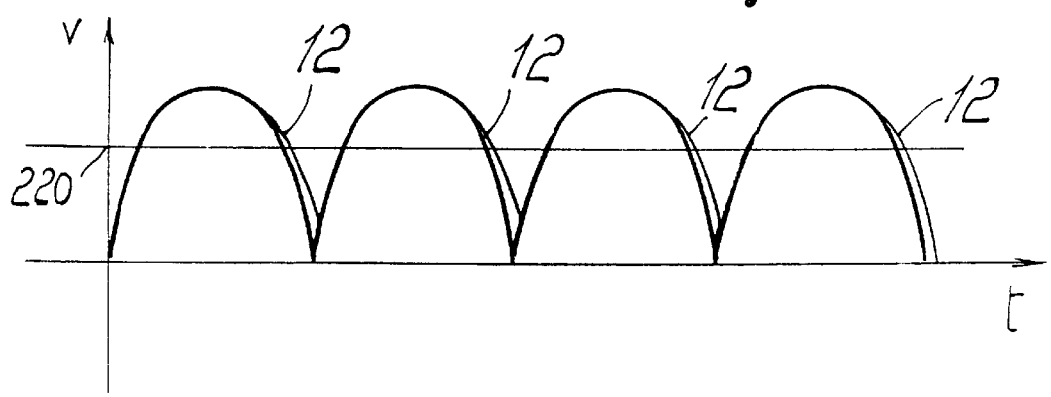

FIGS. 3a–3c will be explained hereinafter in relation to the operation of the circuit according to the invention.

Figure 5:
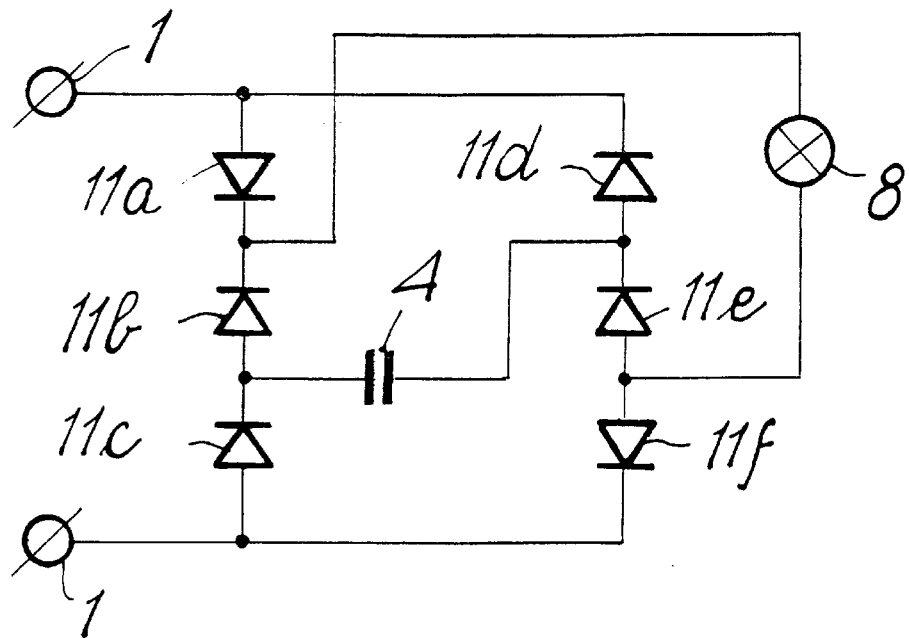
FIG. 5 is a view of a third embodiment of the circuit according to the invention.
Figure 5A:
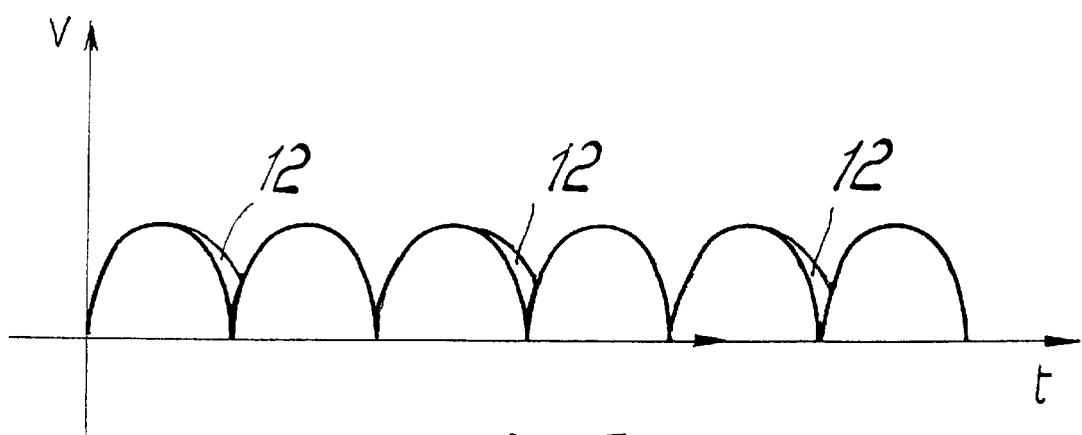
FIG. 5a plots the output waveform of the voltage, as a function of time, for the circuit of FIG. 5.

FIG. 5 illustrates a third embodiment of the circuit according to the invention, in which there are six diodes 11a–11f that perform the function performed by the means 3 of the circuit of FIG. 1.

In this case, the six diodes 11a–11f perform full-wave rectification and the capacitor 4 complements the AC mains supply voltage at every other half-wave.

This behavior of the capacitor 4 is clearly shown in FIG. 4a, where the reference numeral 12 designates the voltage complement provided by the capacitor 4.

Figure 6:
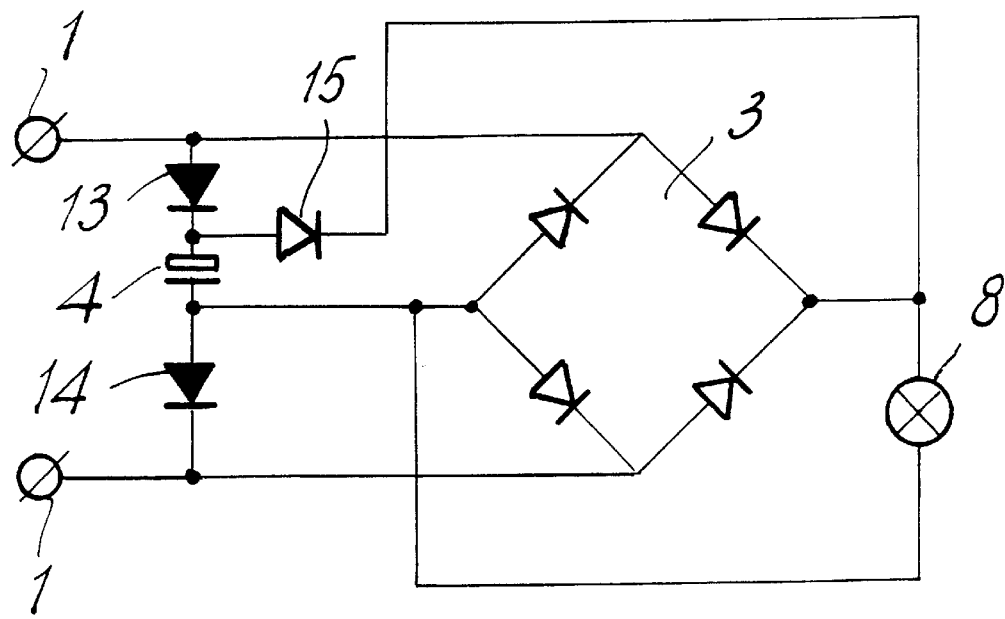
FIG. 6 is a view of a variation of the third embodiment of the circuit according to the invention.

FIG. 6 is a view of a variation of the third embodiment of the circuit according to the invention, illustrated in FIG. 5. In this case there are diodes 13, 14, and 15, connected as shown in FIG. 6, in addition to the diodes that constitute the diode bridge 3; said diodes have the effect of performing full-wave rectification and of complementing the rectified AC voltage at every other half-wave.

Figure 6A:
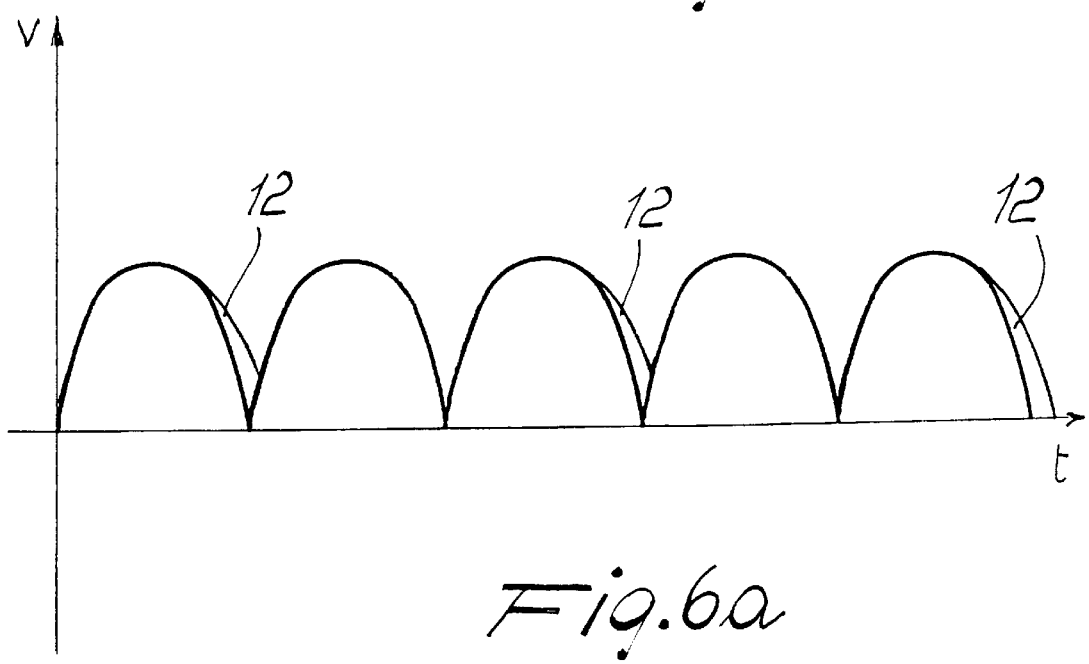
FIG. 6a plots the output waveform of the voltage, as a function of time, for the circuit of FIG. 6.

This last behavior is shown in FIG. 6a.

Figure 7:
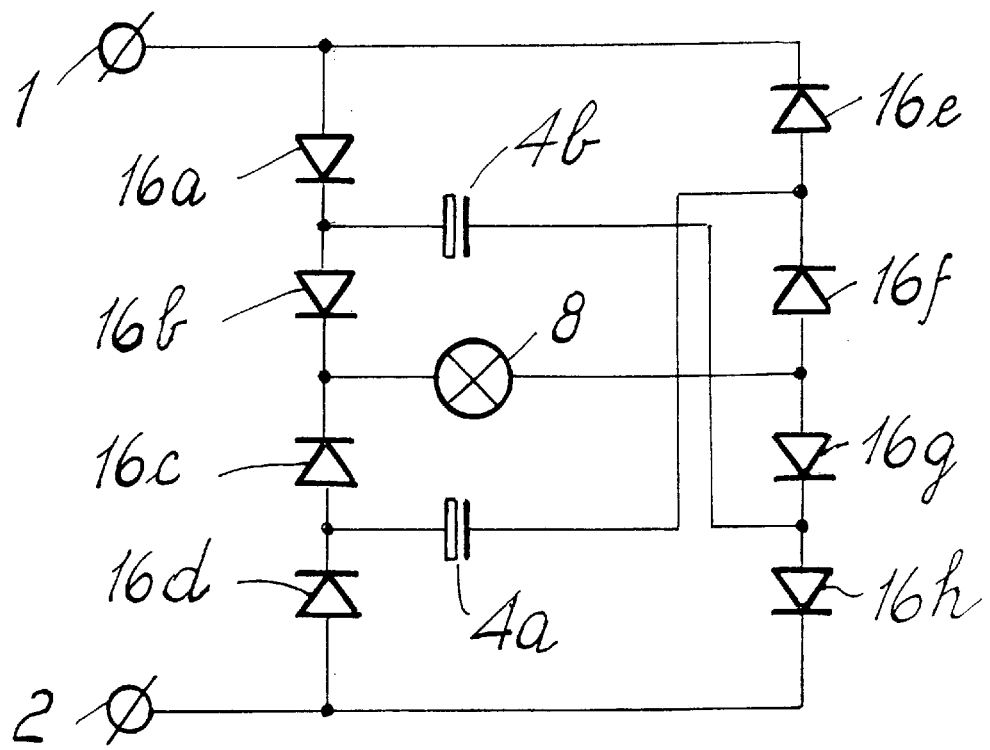
FIG. 7 is a view of a variation of the first embodiment of the circuit according to the invention shown in FIG. 1.
Figure 7A:
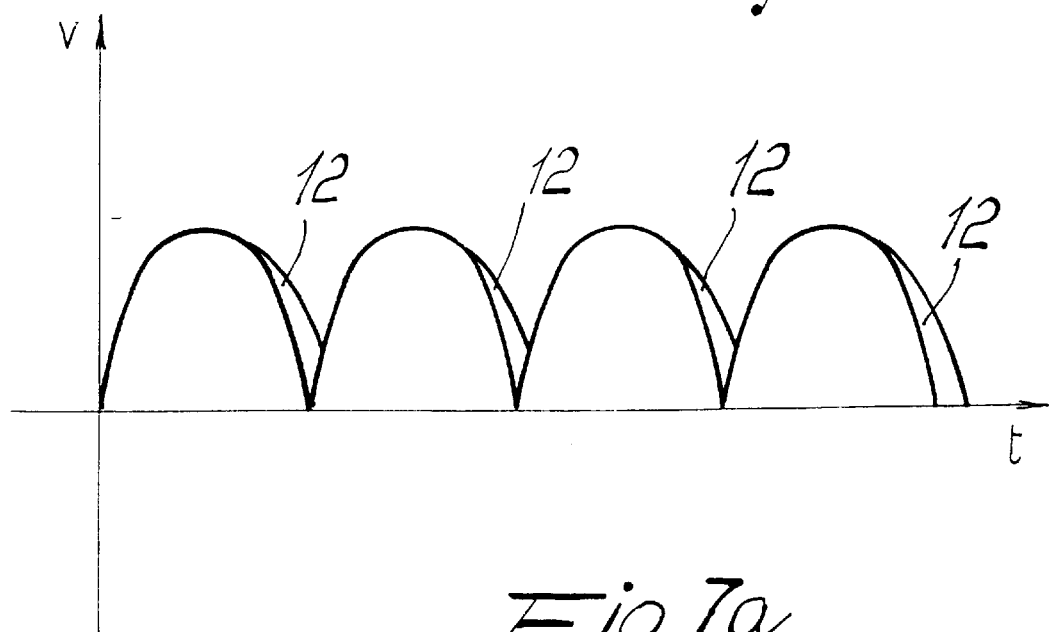
FIG. 7a plots the output waveform of the voltage, as a function of time, for the circuit of FIG. 7.

FIG. 7 is a view of a variation of the first embodiment of the circuit according to the invention, in which there are eight diodes 16a–16h and two capacitors 4a and 4b, which have the function of complementing every half-wave of the rectified AC voltage.

Figure 8:
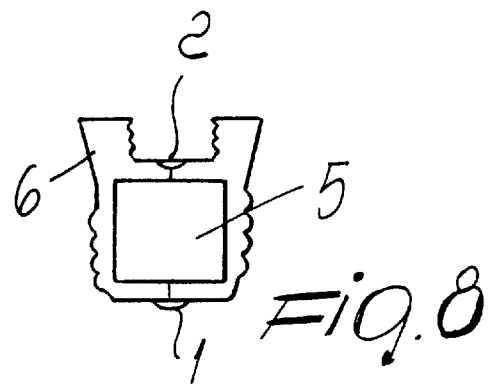
FIG. 8 is a view of the circuit according to the invention inserted in an adaptor that is suitable to be screwed to a lamp.

FIG. 8 is a view of the box-like body 5 that accommodates the circuit of FIG. 1, inserted in an adaptor 6 in which the input 1 is configured so as to screw itself in the place of a conventional lamp and the output 2 allows the insertion of any lamp.

The circuit according to the invention can of course also be inserted in an extension cord, a lamp holder, a switch, and the like.

Figure 9:
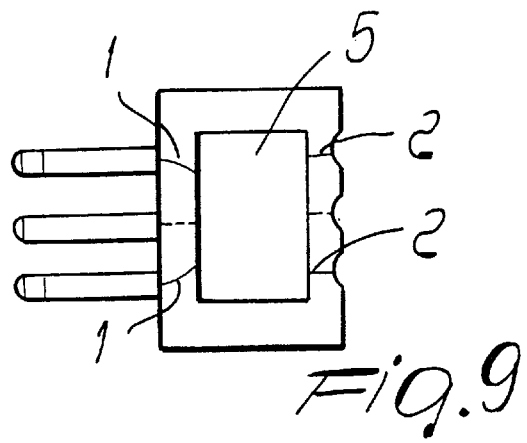
FIG. 9 is a view of the circuit according to the invention, inserted in a plug.

FIG. 9 is a view of said box-like body 5 inserted within a conventional plug 7 provided with a socket.

In all of these figures, the input and output terminals 1 and 2 correspond to the input and output terminals 1 and 2 shown in FIG. 1.

Figure 10:
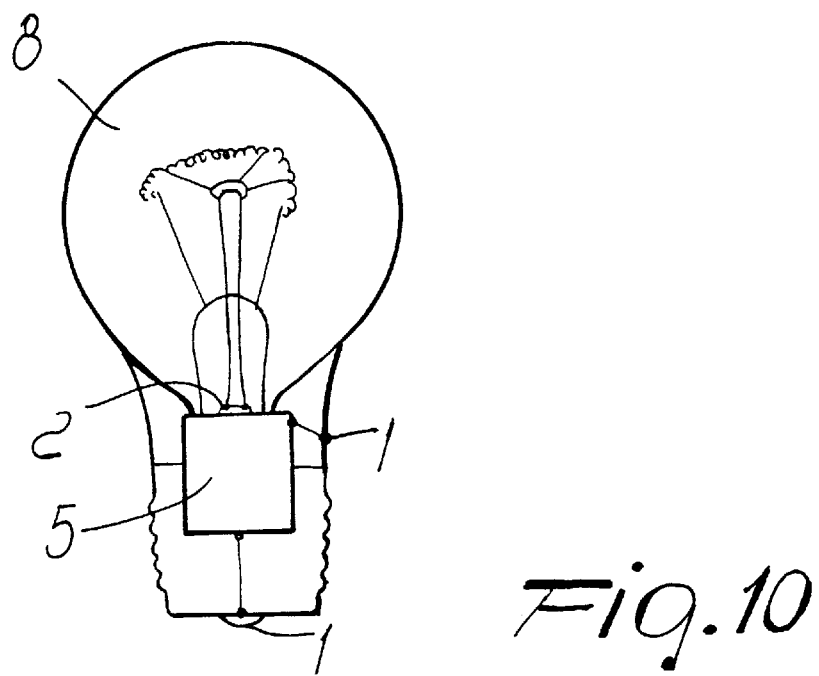
FIG. 10 is a view of the circuit according to the invention, inserted in a lamp.

FIG. 10 shows the use of the circuit of FIG. 1, accommodated within the box-like body 5 and inserted in a conventional incandescent lamp 8. In this case, the input terminals 1 are directly connected to the threaded base of the incandescent lamp 8, whereas the output terminals 2 are connected to the fuse enclosure of said lamp 8.

With reference to the above figures, and particularly initially to FIG. 1, the operation of the circuit according to the invention is as follows.

The rectifier 3 interposed between the mains and the light source to be supplied rectifies the current from AC to pulsed DC. The capacitor 4 is initially drained, and thus has a resistance that tends to zero, whereas the diodes that constitute the diode bridge (rectifier) 3 act at this time as a load resistor, allowing, during the first instant of power-on, the flow of current only in the capacitor 4, protecting the lamp from thermal shock. The capacitor 4 thus charges, storing the voltage differential that occurs between the rated voltage and the effective voltage, so as to gradually return it, during the subsequent discharge, to the light source.

In this manner, depending on the value of the capacitor 4 that is placed in output with respect to the rectifier means 3, it is possible to utilize at will the voltage differential that occurs between the rated voltage and the effective voltage, which would otherwise be lost.

In practice, the utilization of the peak voltage value is always linked to the values of the resistance of the load and of the capacitance of the capacitor 4. By varying these parameters, particularly by varying the value of the capacitance as a function of the resistance offered by the lamp to be used, it is possible to always supply the lamp with the optimum voltage value.

The behavior of the capacitor 4 can be likened to the behavior of a "battery", since it constitutes an actual reserve of energy whose value can vary according to the value of the capacitance of the capacitor itself.

The circuit according to the invention therefore behaves like a device for raising the supply voltage (that is to say, it behaves like a step-up transformer or a voltage booster) without being affected by the typical drawbacks of said devices (consumption, bulk, cost); furthermore, the voltage is delivered gradually, avoiding thermal shocks of the lamp, adapts to any input voltage and any output power level, and protects the load against transients.

The resistor 9 has a value that is chosen so as to discharge the capacitor 4 both when there is no load (incandescent lamp connected to the terminals 2) and when disconnection of the mains power supply occurs. This is done to prevent the capacitor 4 from remaining charged even if the circuit is disconnected.

The fuse 11 arranged at the input terminals 1 is provided as a protective element in case of circuit failure.

Let us now consider the operation of the circuit according to the invention (see FIG. 1) by referring to numeric examples, in order to illustrate the method for defining the capacitive value of the capacitor 4.

Assume, for example, a resistive load constituted by a lamp with a power level of 40 W at the operating voltage of 230 V.

Assume that the lamp is supplied at 200 V instead of 230 V.

If the supply voltage is 200 V, then the consumption of the lamp decreases (it becomes less than 40 W) and the lumens that it supplies also decrease.

Infact, if one considers the relation I=W/V, where I is the intensity of the current that flows through the lamp filament, W is the power level of the lamp, and V is the supply voltage, one obtains:
I=W/V, that is to say, 40/230=0.17 A
Since R=V/I=1352 ohm
I (at 200 V)=V/R=200/1352=0.16 A
W=V*I=0.16*200=32 W (actual consumption of the lamp)

Therefore, at 200 V a 40-W lamp actually consumes only 32 W, with a loss of 8 W.

Table 1 shown hereinafter was obtained experimentally with a reference 40-W lamp at 230 V and shows that the loss in lumens caused by the lower actual consumption of said lamp is approximately 2 lumen/watt.

Therefore, the lamp used at 200 V is supplied insufficiently to provide the best possible luminous efficiency.

Table 1 in fact shows that the luminous efficiency of a 40-W lamp at 230 W is 9.13 lumen/watts, whereas for example at 190 V it decreases to 6.12 lumen/watt, with an actual loss of 3.01 lumen/watt.

The difference in consumed watts is 10 W, and by giving the capacitor 4 a value of 20 μF (that is to say, 2* difference in watts, in this case 10), the capacitor 4 is capable of complementing the supply voltage of 190 V by providing the missing watts to return the lamp to optimum operation, as if the supply voltage were 230 V (the value that is preset to achieve optimum luminous efficiency of the lamp).

TABLE 1

Measurements made with a Leuci 40-W, 230-V lamp

| Volt/AC | lumen | mA/AC | watts | lm/w |
|---|---|---|---|---|
| 130 | 41 | 130 | 16.9 | 2.42 |
| 140 | 54 | 135 | 18.9 | 2.85 |
| 150 | 72 | 140 | 21 | 3.42 |
| 160 | 93 | 145 | 23.2 | 4 |

TABLE 1-continued

Measurements made with a Leuci 40-W, 230-V lamp

| Volt/AC | lumen | mA/AC | watts | lm/w |
|---|---|---|---|---|
| 170 | 119 | 150 | 25.5 | 4.66 |
| 180 | 149 | 155 | 27.9 | 5.34 |
| 190 | 184 | 159 | 30.2 | 6.12 |
| 200 | 223 | 162.5 | 32.5 | 6.86 |
| 210 | 268 | 165 | 36.46 | 7.35 |
| 220 | 318 | 170 | 37.4 | 8.5 |
| 230 | 365 | 174 | 40 | 9.13 |
| 240 | 428 | 176 | 42.24 | 10.13 |
| 250 | 505 | 180 | 45 | 11.22 |
| 260 | 578 | 185 | 48.1 | 12 |
| 270 | 660 | 189 | 51 | 12.94 |
| 280 | 746 | 193 | 54 | 13.81 |
| 290 | 855 | 195 | 56.55 | 15.11 |
| 300 | 965 | 200 | 60 | 16.8 |
| 310 | 1065 | 204 | 63.24 | 16.84 |
| 320 | 1189 | 206 | 65.92 | 18.03 |
| 330 | 1302 | 210 | 69.3 | 18.78 |
| 340 | 1440 | 214 | 72.76 | 19.79 |
| 350 | 1574 | 216.5 | 75.77 | 20.77 |
| 360 | 1745 | 220 | 79.2 | 22.03 |
| 370 | 1880 | 224 | 82.88 | 22.68 |
| 380 | 2120 | 227 | 86.26 | 24.57 |
| 390 | 2290 | 230 | 89.7 | 25.52 |
| 400 | 2520 | 234 | 93.6 | 26.92 |
| 410 | 2700 | 237 | 97.17 | 27.78 |
| 420 | 2860 | 240 | 100.8 | 28.37 |
| 430 | 3100 | 244 | 104.92 | 29.54 |
| 440 | 3300 | 246 | 108.24 | 30.48 |
| 450 | 3500 | 250 | 112.5 | 32 |

A constant factor, useful in determining the value of the capacitor 4, was thus deduced from experimental measurements. Said constant factor is given by value 2, by which one must multiply the difference in watts given by lamp consumption at the optimum voltage (rated voltage) minus the actual consumption of the lamp (a function of the supply voltage that is actually used).

It has therefore been found that approximately 2 μF of capacitance of the capacitor 4 are necessary for every watt that is required, that is to say, for every additional watt needed to restore the lamp to optimum operation.

The following table provides examples of the relations between the voltages, the lumens per watt, and the values of the capacitor 4.

| lm/W | Effective voltage | Desired voltage | Difference in watts | C(μF) | lm/W |
|---|---|---|---|---|---|
| 4.66 | 170 (25.5 W) | 230 (40 W) | 14.5 | 29 | 9.13 |
| 5.34 | 180 (27.9 W) | 230 (40 W) | 12.1 | 24.2 | " |
| 6.12 | 190 (30.2 W) | 230 (40 W) | 9.8 | 19.6 | " |
| 6.86 | 200 (32.5 W) | 230 (40 W) | 7.5 | 15 | " |
| 7.35 | 210 (36.4 W) | 230 (40 W) | 3.6 | 7.2 | " |
| 8.5 | 220 (37.4 W) | 230 (40 W) | 2.6 | 5.2 | " |
| 9.13 | 230 (40 W) | 230 (40 W) | 0 | 0 | " |

The constant factor 2 determined before is valid for an AC voltage of 220–230 V. For other AC values the constant factor is different and is defined in the following table 2.

Such table shows the relationships between the capacitance values to be chosen and the voltage values.

TABLE 2

| constant factor | | AC voltage value |
|---|---|---|
| preferred range | optimum value | |
| 15–45 | (32.5) | 12.5 |
| 8–22 | (16) | 25 |
| 6–18 | (11) | 37.5 |
| 4.5–17 | (8.8) | 50 |
| 4–16 | (7) | 62.5 |
| 3–15 | (5.8) | 75 |
| 2.5–14 | (5) | 87.5 |
| 2.2–13 | (4.5) | 100 |
| 2–12 | (4) | 112.5 |
| 1.5–10 | (3.5) | 125 |
| 1.5–9 | (3) | 150 |
| 1.2–6 | (2.5) | 200 |
| 1–4.5 | (2) | 220 |
| 0.5–3.5 | (1.5) | 440 |

The above Table 2 shows, within brackets, the best values for the constant factor found by the inventor. It is to be noted that these values are obviously affected by errors due to testing equipment.

Figure 12:
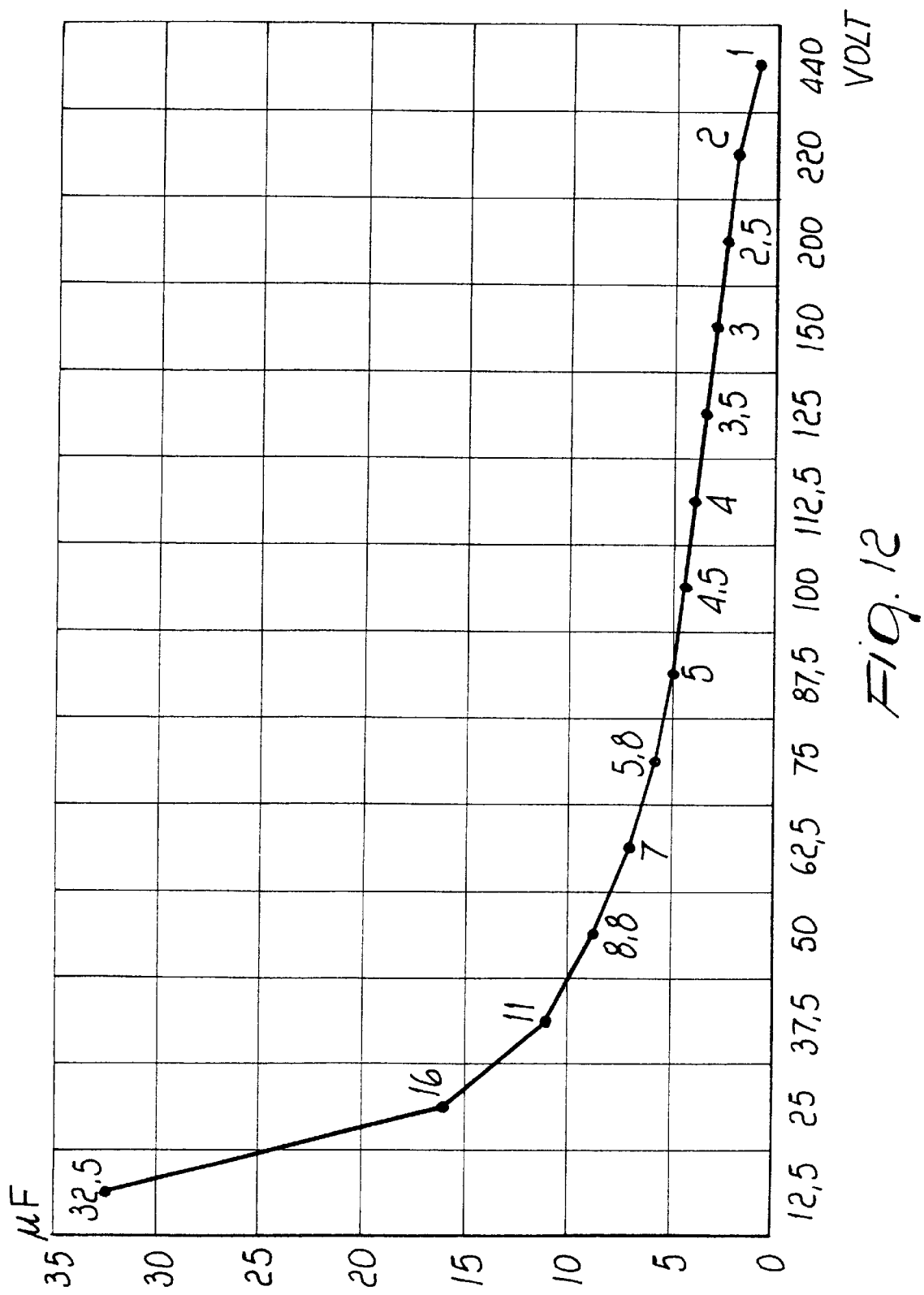
FIG. 12 plots the capacitance values as a function of the voltage values.

Table 2 is summarized in FIG. 12.

Figure 13:
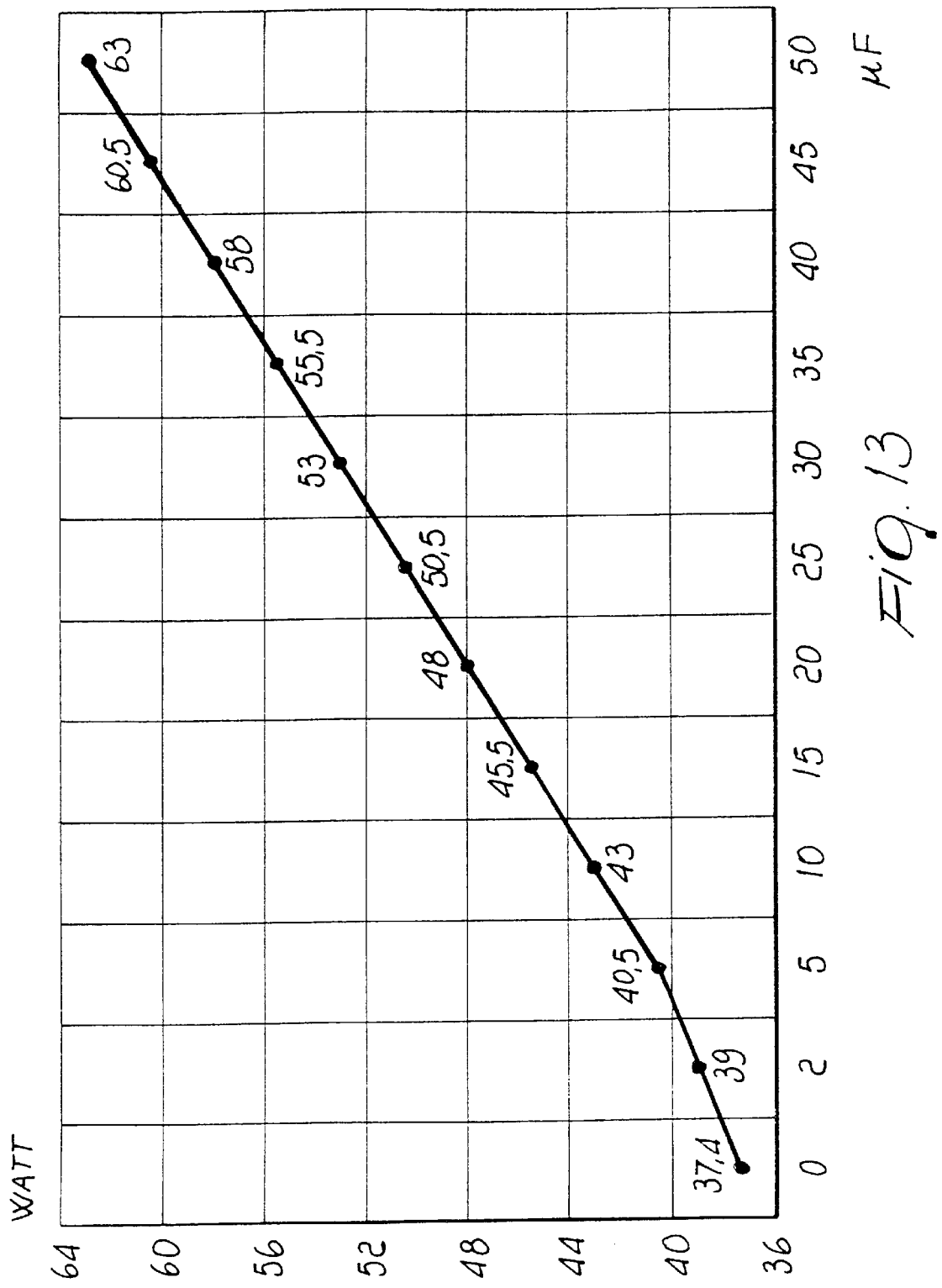
FIG. 13 plots the power values as a function of the capacitance values.

FIG. 13 shows (for a 40 W 220 V lamp, which at this voltage actually has a power of 37.4 Watt) the relationship between the power delivered by the lamp (Watt) and the capacitance values ($\mu$F).

Voltage increase is thus obtained by choosing a proper capacitor value by multiplying the required additional watts (determined by measuring the actual power and subtracting this value from the nominal power of the lamp or any resistive load in general) by the proper constant factor selected from Table 2.

It is to be noted that the power supply increase due to the presence of the capacitor does not modify the effective voltage value, which is always the same. This does not occur if one uses a conventional transformer.

In practice, the square root of 2 which is the optimum constant value by which one must multiply the nominal voltage value to obtain the effective value and which is the maximum voltage value obtainable with a perfect voltage rectification by a rectifier is, with the present invention, employed differently.

In fact, the voltage increase ranges from 0 to the actual voltage multiplied by 1.41($\sqrt{2}$). It is thus possible to obtain a voltage increase according to any of the intermediate values between 0 and 1.41, by selecting the capacitor value as explained before.

In addition to complementing the insufficient voltage values, by means of the circuit according to the invention it is possible to achieve an excess of watts, with a consequent gain in 1 m/watt, without however having an increase in the effective voltage (the voltage peaks always remain at the same value), since the rated voltage remains always the same (that is to say, 230 V in ideal conditions). In practice, it is possible to set the value of the capacitor 4 by means of the factor 2 (in case of 220–230 V) multiplied by the desired watts, which can be provided as a complement or as an addition.

For example, if one has a 40-W lamp that is meant for a 230 V power supply but is instead supplied at 200 V, the following possibilities occur:

| C($\mu$F) | W delivered with the addition of the capacitor | lm/W |
|---|---|---|
| 0 | 0 + 32.5 = 32.5 | 6.86 |
| 10 | 5 + 32.5 = 37.5 | 9 |
| 15 | 7.5 + 32.5 = 40.0 | 10.5 |
| 20 | 10 + 32.5 = 42.5 | 11.4 |
| 25 | 12.5 + 32.5 = 45 | 12 |
| 30 | 15 + 32.5 = 47.5 | 13.4 |
| 35 | 17.5 + 32.5 = 50 | 14 |

It is to be noted that the capacitance values from 20 to 35 $\mu$F bring the lamp to deliver a power (W) greater than the rated one.

This example shows that it is possible to have a gain in luminous efficiency that can be varied at will according to the choice of the capacitor.

If one were to use a conventional-type transformer to raise the supply voltage to the desired value if said voltage is insufficient (for example from 190 V to 220 V) instead of using the circuit according to the invention, one would run the risk (in addition to the above mentioned drawbacks) of burning out the transformer if the supply voltage returns to the desired value (220 V) for a short period. With the circuit according to the invention this does not occur, since one merely obtains greater luminous efficiency in output.

FIG. 1a shows the various degrees of complementing that can be obtained with a capacitor having the same value according to the power level of the lamp (resistive load).

FIGS. 3a to 3c illustrate the waveforms of the rectified AC voltage to which the complement provided by the capacitor 4 is added.

In these figures, the capacitor always has a value of 10 $\mu$F and the power of the lamp varies. FIGS. 3a to 3c show the different degrees of complementing obtained by the capacitor 4 with a 25-W, 40-W, and 60-W lamp, respectively. It is clearly shown that the higher the power of the lamp, the lower the resulting complementing, designated by the reference numeral 12, for an equal capacitive value.

The circuits shown in FIGS. 4, 5, 6, and 7 are merely a few of the possible embodiments of the circuit according to the invention shown in FIG. 1.

The circuit shown in FIG. 7 uses two capacitors 4a and 4b, and therefore the capacitive value for each one of said capacitors is reduced to 1 $\mu$F for each desired (complementary or additional) watt.

Figure 11:
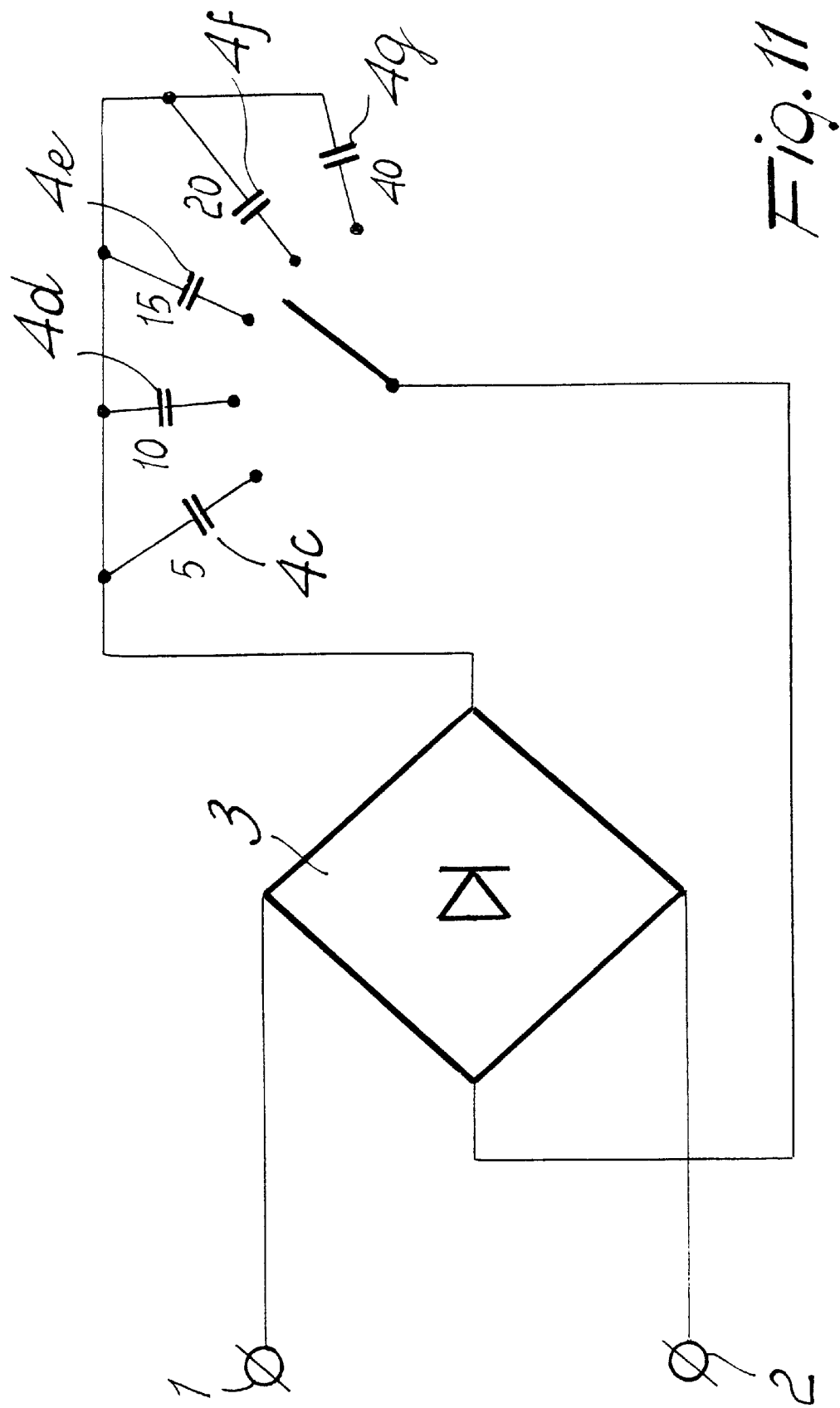
FIG. 11 is a view of the circuit according to the invention, with a plurality of capacitors having different capacitances connected in output to the rectifier means.

It is furthermore possible to provide a circuit in which there are capacitors having different values and in which switching from one capacitor to the other can be achieved according to the operating requirements. Said circuit is shown in FIG. 11, in which the various capacitors are designated by the reference numerals 4c to 4g. Each one of said capacitors has a different capacitance, so as to adapt the circuit to different operating conditions (i.e. different voltage values supplied by the mains).

In practice it has been observed that the circuit according to the invention fully achieves the intended aim, since it allows to provide a circuit for complementing the AC mains supply voltage so as to always supply a resistive-type load with the optimum (or in any case desired) voltage value.

The possibility of using the effective voltage peaks to supply the lamp allows to use the lamp in an optimum manner; furthermore, in case of particularly low mains voltage values, the lamp can thus be rendered insensitive to this fact by still using the real peak values of the voltage.

Furthermore, for an equal power level of the lamp that is used, the brightness of the lamp, expressed in lumen/watt, is much higher than that of a lamp that is used in the known manner.

The energy saving produced by the use of the circuit according to the invention arises from the possibility of using less powerful lamps, since their efficiency in lumen/watt is always optimum.

Differently from what is provided in the circuits of the known art and in conventional rectifying and smoothing circuits, in the circuit according to the invention one does not seek to achieve perfect smoothing of the AC voltage so as to make it become DC. On the contrary, what the circuit according to the invention seeks to avoid is indeed the conversion of the voltage from AC to DC, in order to avoid supplying the load with DC, with the above mentioned drawbacks.

It is thus evident that the use of a rectifying and smoothing circuit such as the circuit according to the invention does not have, in this application, any smoothing purposes; the capacitive means used to clip the peaks of the rectified AC voltage are instead chosen with values that are low enough to keep the sinusoidal nature of the voltage practically unchanged (this can be easily noted by measurements performed with an oscilloscope) but are sufficient to ensure complementing of the half-waves of the AC voltage; this complementing, for an equal value of the capacitive means, increases as the resistance offered by the resistive load arranged downstream of the circuit according to the invention increases.

The present invention therefore uses an AC voltage that is only partially modified (but not converted to DC) to supply a resistive load, overcoming a widespread technical prejudice according to which such a supply would be highly undesirable, because a load is commonly supplied either directly from the mains (AC voltage taken from the mains) or with the interposition of a smoothing and rectifying circuit, which however has the purpose of achieving perfect conversion of the AC voltage into DC voltage, but certainly not with an "impure" AC voltage.

As explained before, the rectification is only one of different ways to prevent the processed portion of the voltage from returning to the mains.

The circuit according to the invention also overcomes the conventional technical prejudice according to which a transformer is employed to carry out the conventional transformation 220V AC/√2=156V AC, which multiplied by √2 gives the final value of 220 V CC.

The circuit according to the invention can also be used with lamps of the halogen type, as well as with all resistive-type appliances (for example an immersion heater), including AC motors provided with brushes or sliding contacts on the rotor.

Finally, the present invention allows to eliminate thermal shocks at lamp power-on, which break the filament of said lamp, thus gradually feeding the supply voltage to the lamp.

The circuit thus conceived is susceptible of numerous modifications and variations, all of which are within the scope of the inventive concept; all the details may furthermore be replaced with other technically equivalent elements.

In practice, the materials employed, so long as they are compatible with the specific use, as well as the dimensions, may be any according to the requirements and the state of the art.

What is claimed is:

1. A method for complementing the AC mains supply voltage, particularly for use with resistive loads, comprising the steps of:

process the AC voltage output from an AC source towards a resistive load so as to obtain a rectified but still sinusoidal voltage, and preventing a reverse flow of the resulting processed voltage towards said AC voltage power source;

storing said rectified AC voltage in at least one capacitive means arranged ahead of said resistive load;

complementing, during discharge of said at least one capacitive means towards said resistive load, said AC supply voltage until a desired voltage increase with respect to the actual value of said voltage supply is reached, said voltage increase being obtained by choosing the values of said one or more capacitive means by multiplying the required additional watts, determined by measuring the actual power consumed by the resistive load and subtracting it from the nominal power of the load, by a constant factor derived from the relationships between the capacitance values and the supply voltage values, said actual power being the power consumed by the resistive load powered by the AC voltage supply, said nominal power being the power that the resistive load consumes when the supply voltage supplied to said load has an optimum and predetermined value for the load.

2. A circuit for complementing the AC mains supply voltage, particularly for resistive loads, comprising means inserted between an AC power source and a resistive load, said means being adapted to prevent a reverse flow of a rectified portion of the AC supply voltage towards said AC power source, and at least one capacitive means arranged ahead of said resistive load, wherein the values of said one or more capacitive means are chosen, by multiplying the required additional watts, determined by measuring the actual power consumed by the resistive load and subtracting it from the nominal power of the load, by a constant factor derived from the relationships between the capacitance values and the supply voltage values, said actual power being the power really consumed by the resistive load powered by the AC voltage supply, said nominal power being the optimum power that the resistive load consumes when the supply voltage supplied to said load has an optimum and predetermined value for the load, said circuit having a voltage booster characteristic to supply the resistive load always with a voltage which is at least equal to the optimum voltage predetermined at the factory for said resistive load.

3. A circuit according to claim 2, wherein the value of said at least one capacitive means is chosen between 1.5 and 4.5 the difference between the power consumed by the load during operation at said optimum and predetermined-value and the power that is actually consumed when said load is supplied with a voltage that is different from the optimum and predetermined one.

4. A circuit according to claim 2, wherein said means adapted to prevent the reverse flow of the rectified portion of the AC supply voltage towards said power source comprises at least one diode adapted to perform the half-wave rectification of said AC supply voltage.

5. A circuit according to claim 2, wherein said means adapted to prevent the reverse flow of the rectified portion of the AC supply voltage towards said power source comprises a diode bridge adapted to perform the full-wave rectification of said AC supply voltage.

6. A circuit according to claim 2, wherein said means adapted to prevent the reverse flow of the rectified portion of the AC supply voltage towards said power source comprises a semiconductor device.

7. A circuit according to claim 2, wherein said at least one capacitive means comprises a capacitor adapted to store a charge for subsequent release to said resistive load, said capacitor being connected between the input terminals of the mains supply voltage and said load.

8. A circuit according to claim 2, wherein said means adapted to prevent the reverse flow of the rectified portion of the supply voltage towards said power source and said at least one capacitive means are inserted in a box-shape body provided with input terminals and output terminals, said input terminals being connectable to the mains and said output terminals being connectable to said resistive load.

9. A circuit according to claim 8, wherein said box-shape body is inserted between the fuse enclosure and the threaded base of an incandescent lamp.

10. A circuit according to claim 8, wherein said box-shape body is inserted in a plug with an input socket.

11. A circuit according to claim 8, wherein said box-shape body is inserted in an adaptor that allows to screw on an incandescent lamp.

12. A circuit according to claim 8, wherein said box-shape body is inserted in a switch.

13. A circuit according to claim 8, wherein said box-shape body is inserted in a lamp holder.

* * * * *